US011686218B2

(12) United States Patent
Hodgson et al.

(10) Patent No.: US 11,686,218 B2
(45) Date of Patent: Jun. 27, 2023

(54) PRESSURE SEAL ASSEMBLY

(71) Applicant: PRATT & WHITNEY CANADA CORP., Longueuil (CA)

(72) Inventors: Stuart Hodgson, Georgetown (CA); Felipe Perez, Longueuil (CA); Daniel Poirier, Calixa-Lavallée (CA); Nadim Antoine Najjar, Sainte-Anne de-Bellevue (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 194 days.

(21) Appl. No.: 16/999,971

(22) Filed: Aug. 21, 2020

(65) Prior Publication Data

US 2022/0056814 A1 Feb. 24, 2022

(51) Int. Cl.
| | |
|---|---|
| *F01D 25/18* | (2006.01) |
| *F04D 29/08* | (2006.01) |
| *F04D 29/10* | (2006.01) |
| *F04D 29/12* | (2006.01) |
| *F16C 33/10* | (2006.01) |

(52) U.S. Cl.
CPC ......... *F01D 25/186* (2013.01); *F01D 25/183* (2013.01); *F04D 29/086* (2013.01); *F04D 29/106* (2013.01); *F04D 29/12* (2013.01); *F16C 33/10* (2013.01)

(58) Field of Classification Search
CPC .... F01D 25/183; F01D 25/186; F04D 29/086; F04D 29/106; F04D 29/12; F16C 33/10
See application file for complete search history.

(56) References Cited

U.S. PATENT DOCUMENTS

| | | | |
|---|---|---|---|
| 8,905,408 B2 | 12/2014 | Garrison | |
| 11,261,754 B2 * | 3/2022 | Patard | F01D 25/183 |
| 2013/0078091 A1 * | 3/2013 | Rees | F01D 25/16 |
| | | | 415/230 |

(Continued)

FOREIGN PATENT DOCUMENTS

| | | |
|---|---|---|
| EP | 2112352 A2 | 10/2009 |
| JP | 2018091365 A | 6/2018 |

OTHER PUBLICATIONS

European Search Report issued in counterpart application No. 21192466.7 dated Jan. 10, 2022.

*Primary Examiner* — Courtney D Heinle
*Assistant Examiner* — Andrew J Marien
(74) *Attorney, Agent, or Firm* — Norton Rose Fulbright Canada LLP (57) ABSTRACT

A gas turbine engine having a bearing housing with a housing cavity and a shaft rotating about a rotation axis. One or more bearings support the shaft. A housing supporting the bearing and defining a chamber axially adjacent to the bearing. A seal assembly is in the housing between the chamber and an exterior of the chamber. The seal assembly includes a seal supported by the housing and surrounding the shaft so as to define an annular gap between an inner surface of the seal and an outer surface associated to the shaft, the gap defining a part of a sealing path of the seal assembly for air to flow from said exterior into the chamber. An impeller rotates with the shaft and located radially inward of the gap relative to the rotation axis, the impeller oriented to drive oil toward the bearing.

14 Claims, 3 Drawing Sheets

(56) References Cited

U.S. PATENT DOCUMENTS

| | | | |
|---|---|---|---|
| 2013/0241153 A1* | 9/2013 | Garrison | ................... F02C 7/28 277/350 |
| 2015/0049968 A1 | 2/2015 | Garrison | |
| 2019/0376402 A1 | 12/2019 | Theratil et al. | |
| 2020/0116047 A1* | 4/2020 | Theratil | ................ F01D 25/183 |

* cited by examiner

FIG-1

PRESSURE SEAL ASSEMBLY

TECHNICAL FIELD

The application relates generally to gas turbine engines and, more particularly, to pressure seal assemblies for pressure-sealing bearing chambers of gas turbine engines.

BACKGROUND OF THE ART

Mechanical seals, such as carbon seals, are commonly used in gas turbine engines, generally to seal wet bearing compartments. These seals may be designed to run on an aerodynamic film developed between a stationary outer component (i.e., a seal stator or housing) and a rotating inner component (seal runner or shaft). Indeed, the outer and inner components are typically arranged such that a flow of air may develop along a seal interface between the inner and outer components as the inner component rotates. Controlling a pressure differential across this interface may preserve seal life, although wear may nonetheless occur under certain circumstances.

SUMMARY

In accordance with a first aspect, there is provided a gas turbine engine having a bearing housing with a housing cavity comprising: a shaft rotating about a rotation axis; at least one bearing supporting the shaft; a housing supporting the bearing and defining a chamber axially adjacent to the bearing; and a seal assembly in the housing between the chamber and an exterior of the chamber, the seal assembly including a seal supported by the housing and surrounding the shaft so as to define an annular gap between an inner surface of the seal and an outer surface associated to the shaft, the gap defining a part of a sealing path of the seal assembly for air to flow from said exterior into the chamber, an impeller rotating with the shaft and located radially inward of the gap relative to the rotation axis, the impeller oriented to drive oil toward the bearing.

In accordance with a second aspect, there is provided a seal assembly between a chamber and an exterior of the chamber comprising: a seal supported by a housing defining the chamber and surrounding a shaft along a rotation axis so as to define an annular gap between an inner surface thereof and an outer surface associated to the shaft, the gap defining a sealing path for air to flow from said exterior into the chamber, and an impeller rotating with the shaft and located radially inward of the sealing path relative to the rotation axis, the impeller oriented to maintain oil within the chamber.

In accordance with a third aspect, there is provided a method of sealing a bearing-receiving chamber inside a housing of a gas turbine engine, the method comprising: directing a sealing flow through a sealing path of a seal assembly of the gas turbine engine adjacent the bearing-receiving chamber toward the bearing-receiving chamber; and inducing a displacement flow from inside the sealing path of the seal assembly radially inward of the sealing flow relative to the rotation axis and toward the bearing-receiving chamber along a rotation axis of the gas turbine engine.

DESCRIPTION OF THE DRAWINGS

Reference is now made to the accompanying figures in which.

DETAILED DESCRIPTION

Figure 1:
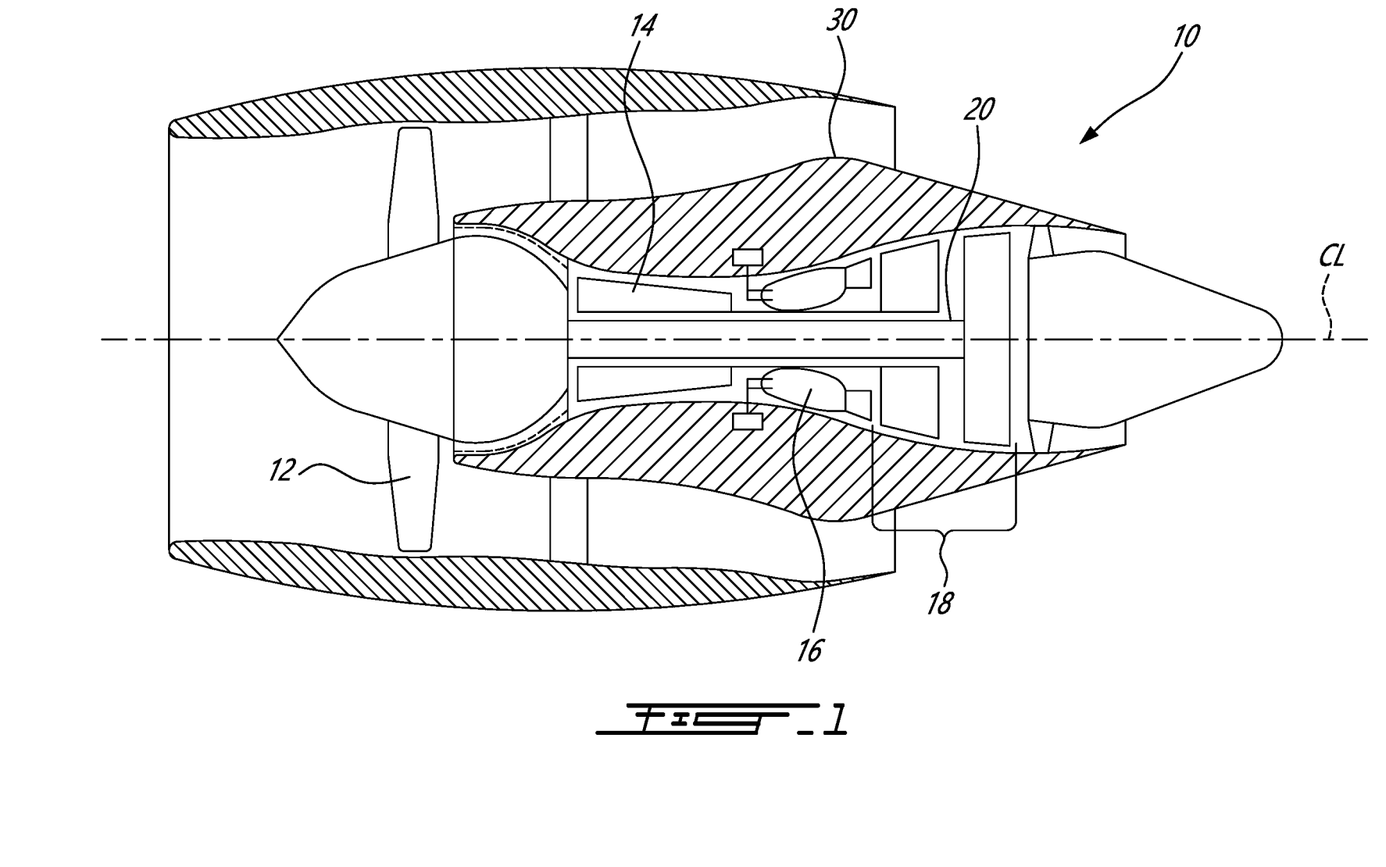
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, the combustor 16 and the turbine section 18 are disposed along a central axis CL of the gas turbine engine 10. Also comprised by the gas turbine engine 10 are one or more shafts, for example a drive shaft 20 rotatable with a driving stage rotor of the turbine section. The drive shaft 20 may extend collinearly to the central axis CL and through a shaft 22 (FIG. 2) of the gas turbine engine 10. The shaft 22 may be a core shaft rotatable with a rotor of the compressor section 14 located at its fore end and with a compression stage rotor of the turbine section 18 located at its aft end. Yet another shaft of the gas turbine engine 10 may be radially offset relative to the central axis CL, for example a shaft of an accessory gearbox of the gas turbine engine 10. A casing 30 of the gas turbine engine 10 encloses the one or more shafts, the compressor section 14, the combustor 16 and the turbine section 18 as well as a gas path of the gas turbine engine 10 downstream of the fan 12. Inside the casing 30, a given shaft may be supported at various locations along its length, typically by way of at least two bearings spaced from one another and providing an annular, low-friction interface between the given shaft and a suitably shaped fixed component of the gas turbine engine 10 surrounding the given shaft.

Figure 2:
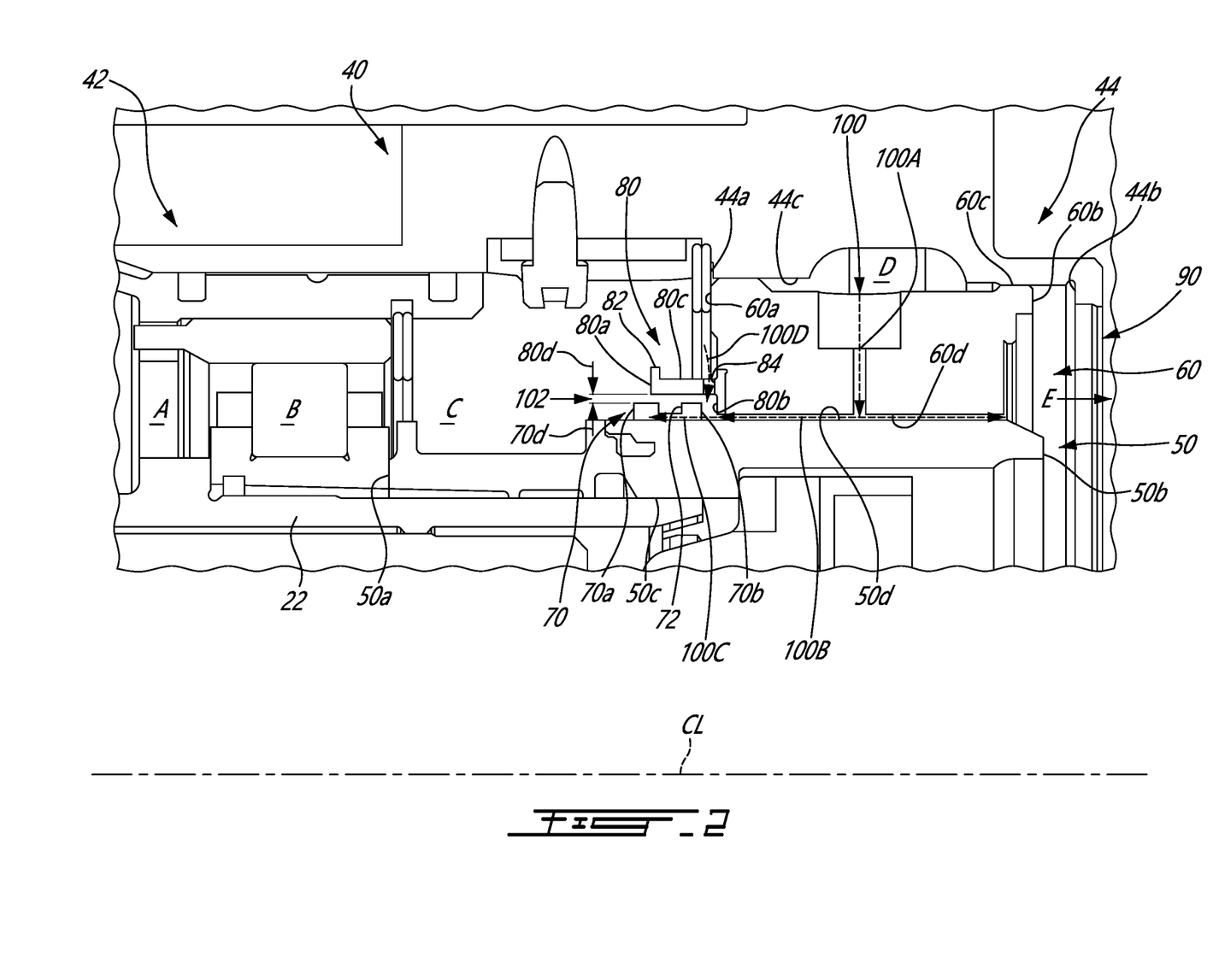
FIG. 2 is a cross sectional view of a bearing chamber of the gas turbine engine of FIG. 1, the bearing chamber between a bearing and a seal assembly in accordance with the present disclosure.

Referring now to FIG. 2, such an arrangement of rotatable components and fixed components of the gas turbine engine 10 will now be described with respect to the central axis CL and the shaft 22. For brevity, the gas turbine engine 10, the central axis CL and the shaft 22 and will henceforth be referred to as the engine 10, the axis CL and the shaft 22. A seal assembly is described hereinbelow as being used for the shaft 22. The shaft 22 is merely given as an example among other shafts of a gas turbine engine that could be provided with such seal assembly.

A housing 40 of the engine 10 located inside the casing 30 defining a housing cavity that encloses a housing bearing cavity A, a bearing B, a chamber C (or bearing chamber or sump) separated from the housing bearing cavity A by the bearing B, and a housing seal cavity D in fluid communication between inside the chamber C and an exterior E of the chamber C. The exterior E may be described as a volume inside the engine 10 separated from the chamber C. At its aft end, the shaft 22 extends inside the housing 40 and through the bearing B. In an embodiment, the shaft 22 is rotatably connected to the bearing B such that a rotational axis of the shaft 22 is collinear with the axis CL of the engine 10. The housing 40 may be said to partition the housing bearing cavity A, the chamber C and the housing seal cavity D from the exterior E. A coolant and/or lubricant substance, such as oil, is typically provided in the chamber C to wet the adjacent bearing B. Supply and drain lines of a lubrication system of the engine 10 may be connected to the chamber C to move oil thereto and therefrom. The chamber C may thus be described as a wet cavity, whereas the exterior E may be described as a dry cavity, as it is typically intended to be unexposed to oil or to have a limited exposure to oil. The exterior E is in fluid communication with the gas path of the engine 10, for example at the turbine section 18. A pressure source of the engine 10, which may be taken inside the gas path upstream of the exterior E, for example at the compressor section 14, is in fluid communication with the housing seal cavity D.

An arrangement of sealing components of the engine 10 may be provided aft of the housing bearing cavity A to seal the chamber C. Such sealing components may include a seal runner 50 mounted to the shaft 22 so as to be rotatable therewith and extending away from the housing bearing cavity A and inside the housing seal cavity D, a seal bushing 60 plugging the housing seal cavity D around the seal runner 50, an impeller 70 circumscribing the seal runner 50 at an inner side of the seal bushing 60, and an extension ring 80 surrounding the seal runner 50 and extending from the inner side of the seal bushing 60, and surrounding the impeller 70. The seal runner 50, the seal bushing 60, the impeller 70 and the extension ring 80 may be said to form a seal assembly 90 of the engine 10. For instance, the seal runner 50 and the impeller 70 may be referred to as a seal rotor of the seal assembly 90, whereas the seal bushing 60 and the extension ring 80 may be referred to as a seal stator of the seal assembly 90.

As will be described hereinbelow, the seal assembly 90 forms a flow path referred to herein as a sealing path 100, which may include supply, interface, buffer and bleed path portions 100A, 100B, 100C, 100D. At least some of the path portions 100A, 100B, 100C, 100D are arranged for controlling fluid communication between inside the chamber C and inside the exterior E as the engine 10 operates. For the sake of simplicity, only one seal assembly 90 located aft of the housing bearing cavity A is described herein below. It is however to be understood that the below description may also apply to other seals of the engine 10, and that the engine 10 may comprise one or more additional seal assemblies which generally correspond, mutatis mutandis, to the seal assembly 90. In embodiments, the engine 10 may thus comprise another seal assembly 90 located fore of the housing bearing cavity A.

The sealing assembly 90 is intended as a deterrent for undesirable leakage that may otherwise occur from an interior of the chamber C to the exterior E thereof in presence of a typical mechanical seal, despite a pressure exerted on an outer, exterior-facing side of such typical mechanical seal being greater than that exerted on an inner, interior-facing side thereof upon the engine 10 operating under typical conditions.

Structural characteristics of the seal assembly 90 by virtue of which the leakage may be prevented or at least impeded so as to minimize a leakage rate will now be described. Still referring to FIG. 2, the housing bearing cavity A is formed inside a portion of the housing 40 that may be referred to as a bearing-receiving housing portion 42. Conversely, another portion of the housing 40 spaced axially (i.e., in an axial direction relative to the axis CL) from the bearing-receiving housing portion 42 and inside which the housing seal cavity D is formed may be referred to as a seal-receiving housing portion 44. The housing seal cavity D is in fluid communication with the chamber C by way of an opening inward of an inner-side surface 44a of the seal-receiving housing portion 44. The inner-side surface 44a may be a surface of a retainer ring located inside the housing 40 between the chamber C and the housing seal cavity D, or may instead belong to an annular structure forming a unitary piece with the seal-receiving housing portion 44. Opposite the inner-side surface 44a, the housing seal cavity D is in fluid communication with the exterior E by way of another opening defined inward an outer-side surface 44b of the seal-receiving housing portion 44. The inner-side and outer-side surfaces 44a, 44b face one another, and an inner surface 44c of the seal-receiving housing portion 44 extends therebetween, surrounding the housing seal cavity D. The inner surface 44c may form a housing recess inward the seal-receiving housing portion 44, which may be annular in shape and thus surround the seal bushing 60. The housing recess may be said to form a part of the housing seal cavity D.

The seal runner 50 extends axially away from the housing bearing cavity A toward the exterior E between an inner-side end 50a and an outer-side end 50b thereof. Stated otherwise, the seal runner 50 extends from inside the chamber C and into the housing seal cavity D. In this embodiment, the inner-side end 50a terminates at the housing bearing cavity A, in abutment with the bearing B for example. A portion of the seal runner 50 located in the bearing chamber C may be smaller in diameter relative to another portion of the seal runner 50 located in the housing seal cavity D, such that oil contained in the chamber C may pool inside the smaller, narrower portion before it migrates toward the cavity D. The outer-side end 50b terminates fore of the outer-side surface 44b of the seal-receiving housing portion 44 such that the seal runner 50 does not extend outward of the housing 40. In other embodiments, the inner-side and outer-side ends 50a, 50b may be arranged differently with respect to nearby structures and the seal runner 50 may extend into the exterior E. An inner runner surface 50c of the seal runner 50 extends axially between the ends 50a, 50b and interfaces the seal runner 50 to the shaft 22. The inner runner surface 50c and the shaft 22 may be provided with complementary threads, splines, blocking fit, or other suitable means for mechanically joining the seal runner 50 to the core shaft 22 such that the seal runner 50 may be rotatable therewith. In other embodiments, the seal runner 50 may be integral to the shaft 22. An outer runner surface 50d of the seal runner 50 defines an outer circumference thereof radially outwardly relative to the axis CL, and extends axially between the ends 50a, 50b. A portion of the outer runner surface 50d located inside the housing seal cavity D is cylindrical in shape, and is surrounded by an annular space extending radially outwardly therefrom to the inner surface 44c of the seal-receiving housing portion 44. This portion of the outer runner surface 50d of the seal runner 50 may also be referred to as a rotatable seal surface of the seal assembly 90.

The seal bushing 60, which may also be referred to as a seal block, extends axially inside the housing seal cavity D, away from the chamber C toward the exterior E. The seal bushing 60 may be said to be sized so as to plug the annular space. An interference fit may be provided between the seal-receiving housing portion 44 and the seal bushing 60 so as to locate the seal bushing 60 relative to the housing 40. Inner-side and exterior side ends 60a, 60b of the seal bushing 60 facing away from one another are respectively located proximate the inner-side and outer-side surfaces 44a, 44*b* of the seal-receiving housing portion 44. In this embodiment, the inner-side end 60*a* of the seal bushing 60 is in abutment with the inner-side surface 44*a* of the seal-receiving housing portion 44, whereas the outer-side end 60*a* of the seal bushing 60 is spaced away from the outer-side surface 44*b* of the seal-receiving housing portion 44. An outer bushing surface 60*c* of the seal bushing 60 defines an outer circumference thereof radially outwardly relative to the axis CL, and extends axially between the inner-side and outer-side ends 60*a*, 60*b*. The outer bushing surface 60*c* fits, or matches, the inner surface 44*c* of the seal-receiving housing portion 44, at least locally. The outer bushing surface 60*c* may form a stator recess inward the seal bushing 60, and portions of the outer bushing surface 60*c* located on either side of the stator recess may have outer diameters respectively matching inner diameters of corresponding portions of the inner surface 44*c* of the seal-receiving housing portion 44 located on either side of the housing recess. The inner surface 44*c* and the outer bushing surface 60*c* are complementarily shaped to contact one another at least in some places along their lengths to support the seal bushing 60. In some implementations, the housing recess and the stator recess may define passages between the inner surface 44*c* and the outer bushing surface 60*c* sized for receiving tools or a flow of fluid. and other shapes are possible An inner bushing surface 60*d* of the seal bushing 60 defines an inner circumference thereof radially inwardly relative to the axis CL, and extends axially between the ends 60*a*, 60*b*. A cylindrical portion of the inner bushing surface 60*d* may be said to define a bore of the seal bushing 60 in fluid communication between inside the chamber C and the exterior E and sized to receive the cylindrical portion of the outer runner surface 50*d* of the seal runner 50. This portion of the inner bushing surface 60*d* may also be referred to as a stationary seal surface of the seal assembly 90 constructed of a suitable material that may be self-lubricating, self-polishing, dimensionally stable, heat resistant, and have a high thermal conductivity, among possible properties. Such materials include carbon and carbon-based compounds. The inner bushing surface 60*d* may consist of a plurality of arcuate segments connected end to end, although one-piece implementations are possible. An interior of the inner bushing surface 60*d* is in fluid communication with an exterior of the outer bushing surface 60*c* by way of the supply path portion 100A of the sealing flow paths 100 of the seal assembly 90. The supply path portion 100A extends from the outer bushing surface 60*c*, in this case from an inlet defined inward the stator recess, to the inner bushing surface 60*d*. A cross-section of the supply path portion 100A is generally circular, although other shapes and arrangements are possible. In some implementations, a plurality of supply paths 100A may be provided. The seal bushing 60 and the seal runner 50 may interface one another, at least by way of their respective stationary and rotatable seal surfaces (i.e., the inner bushing surface 60*d* and the outer runner surface 50*d*) so as to form a seal of the engine 10. In this configuration, the supply path portion 100A is in fluid communication with the pressure source of the engine 10, in this case via a conduit of the engine 10 between the pressure source and the housing seal cavity D. The seal-receiving housing portion 44 and the seal bushing 60 may be said to channel any flow received by the housing seal cavity D from the pressure source toward the supply path portion 100A.

In the implementation shown, the seal bushing 60 has an annular body formed of a plurality of segments interconnected to one another. This arrangement is merely an exemplary one among the many that are suitable for the seal bushing 60. In other embodiments, the seal bushing 60 may comprise an integral annular structure instead of the segments.

The seal assembly 90 may also comprise a head assembly (not shown) provided to hinder axial movement or one or both of the seal runner 50 and the seal bushing 60 relative to the seal-receiving housing portion 44 as the seal runner 50 is rotated with the shaft 22. In this case, the head assembly may be annular in shape and include a nut or other suitable fastener that is attachable to the seal-receiving housing portion 44 proximate the outer-side surface 44*b*, and a washer-like structure held in place between the nut and the outer-side end of the seal bushing 60 upon the nut being fastened. Upon the seal runner 50 and the seal bushing 60 being in the above spatial relationship relative to the shaft 22 and to the housing 40, the seal runner 50 may be rotated with the shaft 22 relative to the seal bushing 60. As the shaft 22 rotates, the seal runner 50 and the seal bushing 60 may dynamically settle relative to one another, establishing the interface path portion 100B of the flow paths 100 between the rotatable seal surface (corresponding to the outer runner surface 50*d*) and the stationary seal surface (corresponding to the inner bushing surface 60*d*). In some implementations, the interface path portion 100B may be formed by a small, annular clearance present around the outer runner surface 50*d* and surrounded by the inner bushing surface 60*d*.

The impeller 70 circumscribes the seal runner 50 at a location between the inner-side end 50*a* and the outer-side end 50*b* determined so that the impeller 70 may be located on the inner side of the seal bushing 60 upon the seal bushing 60 being positioned around the seal runner 50 with the seal runner 50 in the above-mentioned relationship relative to the housing 40. Also, the impeller 70 may be arranged relative to the seal runner 50 such that the impeller 70 may be located inside the chamber C next to the housing seal cavity D upon the seal runner 50 being mounted to the shaft 22 and received by the housing 40. This spatial relationship of the impeller 70 relative to the housing 40 may differ depending on the implementation. For example, the impeller 70 may extend from inside the chamber C to inside the housing seal cavity D. Thus, upon the seal runner 50 being rotated with the impeller 70, a displacement flow of fluid, such as oil, may be moved along the axis CL away from the interface path portion 100B and toward the housing bearing cavity A.

Figure 3:
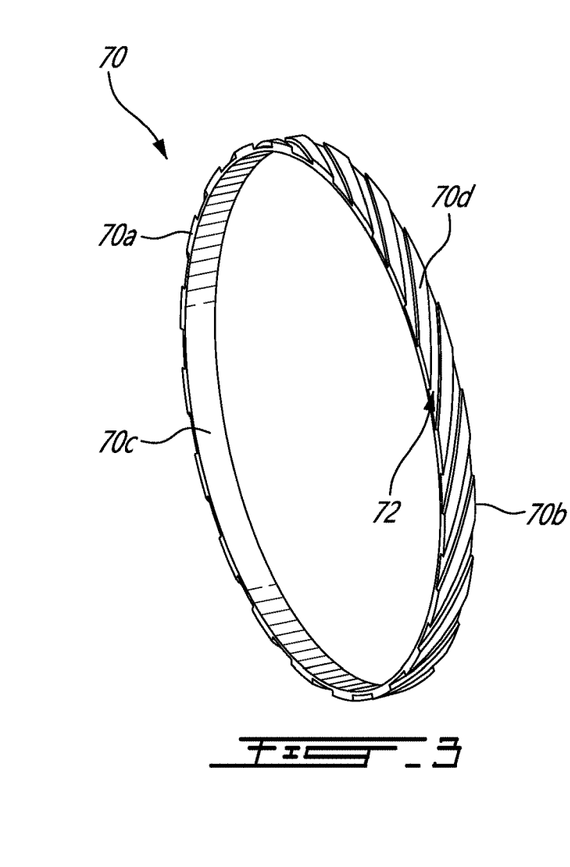
FIG. 3 is a perspective view of an impeller of the seal assembly of FIG. 2.

The impeller 70 is shaped to define a displacement volume, and is arranged to induce the displacement flow by forcing the fluid in the displacement volume axially relative to the axis CL as it rotates about the axis CL. Depending on the implementation, the impeller 70 may have an outer diameter that is greater than an outer diameter of the seal runner 50 taken adjacent to the impeller 70. In an exemplary implementation, the impeller 70 has an inner-side edge surface 70*a* that faces toward the bearing chamber C and extends radially outwardly relative to the axis CL from an inner-side outer diameter of the seal runner 50 to the outer diameter of the impeller 70*a*. The inner-side edge surface 70 may thus act as a baffle that may obstruct some of the oil contained inside the bearing chamber C from flowing toward the interface path portion 100B. The impeller 70 also has an outer-side edge surface 70*b* that faces away from the inner-side edge surface 70*a*. The outer-side edge surface 70*b* extends radially outwardly relative to the axis CL from an outer-side outer diameter of the seal runner 50 to the outer diameter of the impeller 70. The inner-side and outer-side outer diameters of the seal runner 50 correspond to the outer diameter of the outer runner surface 50*d*, although other arrangements are possible. An inner surface 70c (FIG. 3) and an outer surface 70d of the impeller 70, both cylindrical in shape, extend axially between the inner-side edge and outer-side edge surfaces 70a, 70b, the outer surface 70d radially outward of the inner surface 70c. The impeller 70 may thus be said to have an annular shape. The impeller 70 has surface features 72 provided in the form of grooves formed into the outer surface 70d. In an embodiment, the grooves 72 are thread like, and are helical in pattern, although they could be straight and non-parallel to the axis CL. Each groove 72 may be said to form a channel open toward the outer surface 70d and at either end thereof inward the inner-side surface 70a and the outer-side surface 70b. Further, the volume of each groove 72 amounts to the displacement volume. In the illustrated configuration of FIG. 3, the grooves 72 would turn counterclockwise as they extend away from the outer-side surface 70b such that upon the impeller 70 rotating clockwise, fluid inside the grooves 72 may be displaced away from the outer-side surface 70b and thus away from the seal bushing 60. It is contemplated that implementations of the impeller 70 intended to be rotated counterclockwise, the grooves 72 may turn clockwise as they extend away from the outer-side surface 70b.

Figure 4:
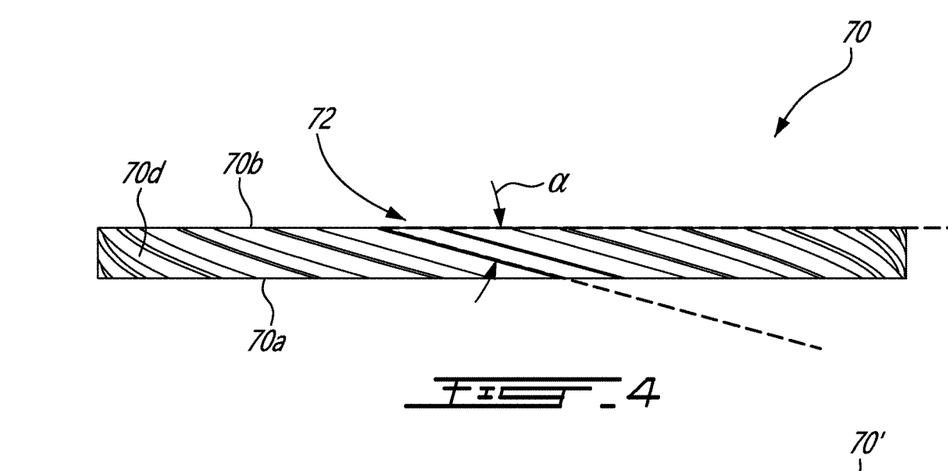
FIG. 4 is a radial view of the impeller of FIG. 3.

As best seen in FIG. 4, the impeller 70 may have a count of twenty grooves 72, whose starts may be evenly distributed along a periphery of the outer-side surface 70b, though this is merely an option. As they extend away from the outer-side surface 70b, the grooves 72 turn at a helix angle α relative to the outer-side surface 70b. The helix angle α is of about 7 degrees. A cross-sectional shape of the grooves 72 may be generally rectangular, and may be sized so as to be wider than it is deep. Other cross-sectional shapes and sizes may be used. The cross-sectional shape may be said to be oriented at the helix angle α relative to the outer-side surface 70b. Edges of the impeller 70, such as those delimiting the outer surface 70d or the grooves 72, may or may not be filleted.

This implementation of the impeller 70 is mounted to the seal runner 50, and may be joined thereto by various suitable means, permanent or not, for blocking any relative movement of the impeller 70 relative to the seal runner 50. Alternatively, the impeller 70 may be integral to the seal runner 50 and, in some such implementations, the outer surface 70d may correspond to a portion of the outer surface 50d of the seal runner 50 located between the inner-side end 50a and the rotatable seal surface, in which case the inner-side and outer-side surfaces 70a, 70b are omitted. The grooves 72 may thus be said to extend between inner-side and outer-side ends of the impeller 70.

Figure 5:
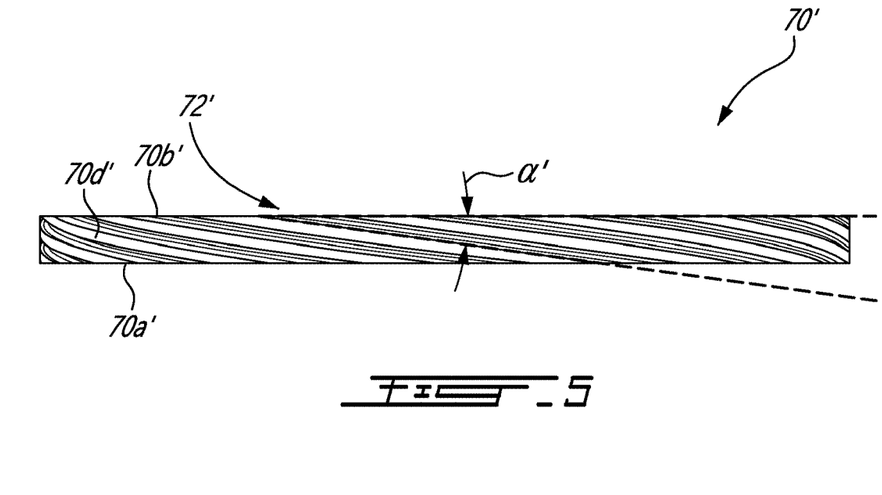
FIG. 5 is a radial view of another implementation of an impeller of a seal assembly in accordance with the present disclosure.

In FIG. 5, another exemplary implementation of the impeller 70 is shown at 70'. It should be noted that elements of the impellers 70, 70' sharing some common structural characteristics bear like names and like reference numerals. The impeller 70' has an outer surface 70d', inwardly of which a count of sixteen grooves 72' are defined. The grooves 72' in this case extend between inner-side and outer-side surfaces 70a, 70b at a helix angle α' of about 15 degrees. A cross-sectional shape of the grooves 72' is curved.

Among other contemplated implementations of the impeller 70, the impeller 70 may have a hub from which the helical surfaces 72 radiate. The helical surfaces 72 may be provided in the form of vanes or thread-like structures.

Turning back to FIG. 2, the extension ring 80 will now be described. The extension ring 80 has inner-side and outer-side ends 80a, 80b opposite one another, and defines a generally cylindrical shape extending therebetween. The inner-side end 80a is located inside the chamber C, and the outer-side end 80 meets the seal bushing 60, in this case at a location inside the housing seal cavity D, whereas the inner-side end 80a is located inside the chamber C unsupported. Radially outwardly, the extension ring 80 is circumscribed by an outer ring surface 80c. Radially inwardly, an inner ring surface 80d of the extension ring 80, generally cylindrical in shape and having an inner diameter greater than that of the inner bushing surface 60d of the seal bushing 60, extends from one end 80a, 80b to the other. The outer and inner ring surfaces 80c, 80d may be said to form an annular wall of the extension ring 80. In this exemplary embodiment, the extension ring 80 includes an annular flange joined to the annular wall at the outer-side end 80b. The annular flange may be embedded in the seal bushing 60, for example in a recess defined in the inner-side surface 60a. The annular flange has an inner diameter that corresponds to that of the inner bushing surface 60d of the seal bushing 60, and may be said to form an outlet of the interface path portion 100B. In other embodiments, the annular flange is not contiguous to the interface path portion 100B. For example, the annular flange may be located around the annular wall at the outer-side end 80b. In yet other embodiments, the annular flange is omitted as the extension ring 80 and the seal bushing 60 form a unitary piece. In some such embodiments, the seal bushing 60 and the extension ring 80 form portions of a seal (or seal stator) of the seal assembly 90 respectively surrounding the interface path portion 100B and the buffer path portion 100C.

At least over a certain span of the extension ring 80 between the ends 80a, 80b, the outer ring surface 80c may have a cylindrical shape that is coaxial to that of the inner ring surface 80d. Also, the outer ring surface 80c may have an outer diameter that is smaller than that of either end 80a, 80b, and may thus be said to form an outer recess of the extension ring 80. The extension ring 80 is sized and positioned relative to the impeller 70 so as to shield the impeller 70 from oil contained in the chamber C and to hinder accumulation of oil inside the chamber C adjacent to the interface path portion 100B. Thus, the extension ring 80 extends axially away from the seal bushing 60 so as to surround at least an outer-side portion of the impeller 70. In the present embodiment, the inner-side end 80a and the outer-side end 80b are respectively located aft of the inner-side end 70a and the outer-side end 70b of the impeller 70. Proximate to the inner-side end 80a, the extension ring 80 has a lip 82 protruding from the outer ring surface 80c. The lip 82 may aid in protecting the underlying seal runner 50 and impeller 70 from oil rendered airborne or moved around the chamber C as the engine operates 10. Proximate to the outer-side end 80b, a bleed opening 84 extends from the outer surface 80c to the inner surface 80d. The bleed opening 84 may aid in draining any oil having pooled onto the extension ring 80 upon the engine 10 shutting down, and may thus be described as drain opening. The bleed opening 84 is tubular in shape and extends radially relative to the axis CL at a top of the extension ring 80, although other shapes, positions and orientations may be used. In some implementations, the extension ring 80 may have a plurality of openings 84. Toward the inner-side end 80a, the inner surface 80d of the extension ring 80 surrounds the seal runner 50 and meets the seal bushing 60 at a location radially outward of the interface path portion 100B, whereas toward the inner-side end 80a, the inner surface 80d surrounds the impeller 70 radially outwardly of its outer surface 70d. The inner surface 80d encloses the buffer path portion 100C of the seal assembly 90. Located immediately downstream of the interface path portion 100B, the buffer path portion 100C is in fluid communication between inside the interface path portion 100B and the chamber C. An annular gap 102 defined between the impeller 70 and the extension ring 80 may be referred to as an outer portion of the buffer path portion 100C, and the displacement volume of the impeller 70 may be said to form an inner portion of the buffer path portion 100C located radially inward of the outer portion. The grooves 72 of the impeller 70 may thus be said to be in fluid communication between the interface path portion 100B and the chamber C. Further, yet another portion of the sealing path 100, referred to as the bleed path portion 100D, extends through the extension ring 80 from the outer surface 80c to the inner surface 80d, in this case via the bleed opening 84. It should be noted that the bleed path portion 100D is in fluid communication between inside the chamber C and inside the buffer path portion 100C upstream of the impeller 70.

In another aspect of the present technology, the sealing assembly 90 is a retrofit seal assembly for a gas turbine engine, and is thus configured to be mounted with respect to a shaft and a housing of the gas turbine engine. In other aspects of the present technology, the impeller 70 and the extension ring 80 are components of a conversion kit for an existing seal assembly of a gas turbine engine, and are thus arranged to be respectively mounted to a runner and a stator of the existing seal assembly.

In view of the above, functional characteristics of the seal assembly 90 and operational characteristics of the engine 10 pertaining to the function of seal assembly 90 will now be described, with respect to a method of sealing a bearing chamber of a gas turbine engine according to another aspect of the present technology.

As the engine 10 operates, the chamber C may be sealed upon a sealing pressure differential being applied across the sealing assembly 90 (or across the seal thereof) of the engine 10. The sealing pressure differential may be a positive pressure differential defined by a difference between an exterior pressure taken outside the sealing assembly 90 opposite the chamber C and an interior pressure taken inside the chamber C. The exterior pressure may correspond to that of the exterior E upon the exterior E being pressurized via the gas path of the engine 10.

The sealing pressure differential may be in effect upon the housing seal cavity D being at a source pressure greater than the interior pressure inside the chamber C, and also greater than the exterior pressure. Under such circumstances, a displacement of gas may occur from inside the housing seal cavity D to inside the chamber C by way of the supply path portion 100A, the interface path portion 100B and the buffer path portion 100C. This displacement of gas may be referred to as a sealing flow. In directing the sealing flow across the supply path 100B and into the interface path portion 100B, the interface path portion 100B may as a result become pressurized, allowing to direct at least a portion of the sealing flow received from the supply path portion toward the chamber C via an inward portion of the interface path portion 100B. Downstream of the supply path portion 100A, a remainder of the sealing flow may be directed toward the exterior E via an outward portion of the interface path portion 100B.

In embodiments, the method may include directing the sealing flow away from the interface path portion 100B toward the chamber C as the sealing pressure differential is applied across the seal assembly. The method may also include inducing a displacement flow of oil from a location inside the buffer path portion 100C toward the chamber C. The displacement flow is radially inward of the sealing flow relative to the axis CL. In doing so, dynamic properties of the sealing flow may remain generally unchanged as the sealing flow travels from inside the interface path portion 100B and across the buffer path portion 100C. For instance, the sealing flow may be directed so as to substantially circumvent the impeller 70 by way of the annular gap 102, whereas the displacement flow induced by the impeller 70 is directed generally axially and remains radially inward of the sealing flow. The displacement flow may also be described as gently interfacing the sealing flow. Under certain circumstances, the sealing flow may be generally laminar as it travels across the buffer path portion 100C.

Such dynamic properties of the sealing flow and of the displacement flow are achieved by way of a suitable arrangement of the impeller 70 and the extension ring 80 relative to one another and to the interface path portion 100B. For instance, the inner surface 80d of the extension ring 80 and the impeller 70 are sized such that the annular gap 102 has a suitable size. The size of the annular gap 102 may be optimized to be small enough to limit an amount of fluid that may flow therethrough toward the interface path portion 100B, and large enough to limit a pressure rise, or suction, across the impeller 70 toward the interface path portion 100b. In sizing the impeller 70, the shape of the helical surfaces 72 may be tuned in various ways to achieve desired dynamic properties. In implementations where the helical surfaces 72 are grooves 72, the helix angle α, cross-sectional shape, depth and width of any one groove 72, as well as the total count of the grooves 72 may be adjusted according to operating conditions of the engine 10, such as a range of rotation speeds of the shaft 22 and specifications of the lubrication system (e.g., oil quantity, oil type, size of the chamber C, etc). The helix angle α may be determined as a function of a rotation speed of the shaft 22 (and thus of the impeller 70) and of a leakage rate. The helix angle α determined based on a given leakage rate observed at a low rotation speed of the shaft 22 may be greater than the helix angle α determined for the same leakage rate observed at a relatively higher rotation speed. The handedness of the helical surfaces 72 may also be selected based on the handedness of the rotation of the shaft 22. It should also be noted that the impeller 70 is arranged such that any portion of its displacement volume located inside the buffer path portion 100C remains constant as the impeller 70 rotates. In other words, a volume of the buffer path portion 100C inside which a fluid may travel remains the same regardless of the rotational position of the impeller 70 about the axis CL. By virtue of this arrangement, any suction exerted downstream of the interface path portion 100B is minimized as the displacement flow is induced.

Further, the impeller 70 is sized to induce the displacement flow at a desired volumetric flow rate based on a rotation speed of the shaft 22 (corresponding to that of the impeller 70) and on a volumetric backflow rate at which oil is expected to flow from the chamber C and into the buffer path 100C. Hence, in sizing the impeller 70, a predetermined rotation speed and a predetermined volumetric backflow rate of the engine 10 may be used to determine the displacement volume for the impeller 70 that is adequate to attain the desired volumetric flow rate upon the impeller 70 rotating at the predetermined rotation speed. In an embodiment, the impeller 70 may be said to have a low profile. This may be expressed in terms of the surface ratio of the cylindrical outer surface 70d, smooth, continuous and/or cylindrical, relative to that of the surface features 72. In an imaginary cylinder encompassing the outer surface 70d, the ratio of the area of the outer surface 70d on the area of the surface features 72 is greater than 1, and at least 1.5. A size of the bleed path portion 100D may also be taken into account in sizing the impeller 70. In the event of the volume of oil present in the buffer path portion 100C being less than expected, for example due to a variation in the volumetric backflow rate or a variation in the distribution of the oil inside the buffer path portion 100C, a volume being available inside the buffer path portion 100C for the sealing flow to expand into may be greater than expected, causing a buffer pressure inside the buffer path portion 100C to be decreased. In embodiments, the method comprises supplementing the sealing flow downstream of the interface path portion 100B to compensate any decrease of the buffer pressure. For this purpose, a bleed flow may be drawn from the bleed path portion 100D and into the buffer path portion 100C upstream of the impeller 70. The displacement flow and decrease in buffer pressure are induced from downstream of the bleed path portion 100D, whereas the bleed flow supplements the sealing flow between the interface path portion 100B and the impeller 70, thereby preventing the decrease of the buffer pressure from causing an increase of the pressure differential across the seal assembly 90.

The impeller 70 may also be said to be sized such that the displacement flow may supplement the sealing flow in maintaining the sealing pressure differential across the seal assembly 90. As the useful life of at least some of the components of the seal assembly 90 such as the seal bushing 60 may be affected by the sealing pressure differential being increased, supplementing the sealing flow in this manner may desirably affect the durability of the seal assembly 90 and the uptime of the engine 10.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine having a bearing housing with a housing cavity, the gas turbine engine comprising:
   a shaft rotating about a rotation axis;
   at least one bearing supporting the shaft;
   a housing supporting the bearing and defining a chamber axially adjacent to the bearing; and
   a seal assembly in the housing between the chamber and an exterior of the chamber, the seal assembly including:
      a seal bushing supported by the housing and surrounding the shaft so as to define a sealing interface between an inner surface of the seal bushing and an outer runner surface associated to the shaft, the sealing interface extending axially from an inner side end to an exterior side end of the seal bushing, the sealing interface defining a part of a sealing path of the seal assembly for air to flow from said exterior into the chamber,
      an impeller rotating with the shaft and projecting radially outwardly from the outer runner surface into the chamber, the impeller having an outer diameter greater than an inner diameter of the inner surface of the seal bushing at the sealing interface, the impeller oriented to drive oil toward the bearing; and
      an extension ring projecting axially away from the inner side end of the seal bushing into the chamber in axially overlapping relationship with the impeller, the extension ring having a smooth inner cylindrical surface surrounding the impeller and an inner ring diameter greater than the outer diameter of the impeller so as to define an annular gap between the impeller and the extension ring, the annular gap being radially outwardly spaced from the sealing interface.

2. The gas turbine engine according to claim 1, wherein the extension ring has an opening defined therein, the opening in fluid communication between the chamber and the sealing path upstream of the impeller.

3. The gas turbine engine according to claim 1, wherein the seal assembly includes a seal runner mounted to the shaft and the outer runner surface associated to the shaft is part of the seal runner.

4. The gas turbine engine according to claim 1, wherein the impeller has an outer impeller surface facing radially outwardly relative to the rotation axis and grooves defined inward of the outer impeller surface.

5. The gas turbine engine according to claim 4, wherein a surface area of the grooves is less than a surface area of the outer impeller surface.

6. The gas turbine engine according to claim 4, wherein the grooves are helical.

7. The gas turbine engine according to claim 6, wherein the grooves extend along the rotation axis at a helix angle in a range of 7 degrees to 15 degrees.

8. A seal assembly between a chamber and an exterior of the chamber comprising:
   a seal bushing supported by a housing defining the chamber and surrounding a shaft along a rotation axis so as to define a sealing interface between an inner surface of the seal bushing and an outer runner surface associated to the shaft, the sealing interface defining a part of a sealing path for air to flow from said exterior into the chamber;
   an impeller rotating with the shaft and projecting radially outwardly from the outer runner surface into the chamber, the impeller having an outer diameter greater than an inner diameter of the inner surface of the seal bushing at the sealing interface, the impeller oriented to maintain oil within the chamber; and
   an extension ring projecting axially away from the inner side end of the seal bushing into the chamber, the extension ring having a smooth inner cylindrical surface extending axially continuously between opposed axial ends thereof, the smooth inner cylindrical surface surrounding the impeller and having an inner ring diameter greater than the outer diameter of the impeller so as to define an annular gap between the impeller and the extension ring, the annular gap being radially outwardly offset relative to the sealing interface.

9. The seal assembly according to claim 8, wherein the extension ring has an opening defined therein, the opening in fluid communication between the chamber and the sealing path upstream of the impeller.

10. The seal assembly according to claim 8, further comprising a seal runner mounted to the shaft, the outer runner surface associated to the shaft being part of the seal runner.

11. The seal assembly according to claim 8, wherein the impeller has an outer impeller surface facing radially outwardly relative to the rotation axis and grooves defined inward of the outer impeller surface.

12. The seal assembly according to claim 11, wherein a surface area of the grooves is less than a surface area of the outer impeller surface.

13. The seal assembly according to claim 11, wherein the grooves are helical.

14. The seal assembly according to claim 13, wherein the grooves extend along the rotation axis at a helix angle in a range of 7 degrees to 15 degrees.

\* \* \* \* \*